(12) United States Patent
Liu et al.

(10) Patent No.: US 11,620,188 B2
(45) Date of Patent: Apr. 4, 2023

(54) METHODS, DEVICES, AND A COMPUTER READABLE MEDIUM FOR RESTORING A FILE IN A VIRTUAL MACHINE DISK

(71) Applicant: EMC IP Holding Company LLC, Hopkinton, MA (US)

(72) Inventors: Jie Liu, Chengdu (CN); Lydia Ying Li, Chengdu (CN); Ophone Ou, Chengdu (CN); Ningping Gou, Shanghai (CN); Qingxiao Zheng, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 544 days.

(21) Appl. No.: 16/173,121

(22) Filed: Oct. 29, 2018

(65) Prior Publication Data

US 2019/0129804 A1 May 2, 2019

(30) Foreign Application Priority Data

Oct. 27, 2017 (CN) .......................... 201711090107.X

(51) Int. Cl.
| | | |
|---|---|---|
| *G06F 16/00* | (2019.01) | |
| *G06F 11/14* | (2006.01) | |
| *G06F 21/62* | (2013.01) | |
| *G06F 9/455* | (2018.01) | |

(52) U.S. Cl.
CPC ...... *G06F 11/1451* (2013.01); *G06F 9/45558* (2013.01); *G06F 21/6218* (2013.01); *G06F 2009/45579* (2013.01); *G06F 2009/45583* (2013.01)

(58) Field of Classification Search
CPC ............ G06F 11/1451; G06F 21/6218; G06F 9/45558; G06F 2009/45579; G06F 2009/45583; G06F 2201/815; G06F 11/1469
See application file for complete search history.

(56) References Cited

U.S. PATENT DOCUMENTS

| | | | |
|---|---|---|---|
| 8,555,377 B2 * | 10/2013 | Pate | H04L 63/0428 726/17 |
| 9,547,562 B1 * | 1/2017 | Feathergill | G06F 11/1469 |
| 9,569,446 B1 * | 2/2017 | Feathergill | G06F 16/188 |
| 10,033,700 B2 * | 7/2018 | Ouye | G06F 21/6209 |
| 10,235,463 B1 * | 3/2019 | Whitmer | H04L 67/10 |
| 2011/0145199 A1 * | 6/2011 | Prasad Palagummi | G06F 11/1469 707/654 |
| 2012/0017114 A1 * | 1/2012 | Timashev | G06F 11/1451 714/15 |
| 2012/0179885 A1 * | 7/2012 | Wade | G06F 11/1451 711/162 |

(Continued)

*Primary Examiner* — Jared M Bibbee
(74) *Attorney, Agent, or Firm* — Krishnendu Gupta; Deepika Bhayana; Derek Lam

(57) ABSTRACT

Embodiments of the present disclosure relate to methods, devices, and computer readable medium for restoring a file in a virtual machine disk. The method comprises: receiving, from a client, a user's request regarding restoring a file in a virtual machine disk. The method further comprises: determining, based on the request and from a backup disk of the virtual machine disk, files accessible to the user. In addition, the method further comprises providing the client with information related to the files accessible to the user.

20 Claims, 7 Drawing Sheets

(56) References Cited

U.S. PATENT DOCUMENTS

| | | | |
|---|---|---|---|
| 2013/0080592 A1* | 3/2013 | Budd | G06F 16/9535 |
| | | | 709/219 |
| 2013/0130653 A1* | 5/2013 | Deasy | C09J 7/21 |
| | | | 455/411 |
| 2013/0173634 A1* | 7/2013 | Shaban Hussein | G06F 16/182 |
| | | | 707/769 |
| 2014/0373126 A1* | 12/2014 | Hussain | H04L 63/0815 |
| | | | 726/9 |
| 2017/0300386 A1* | 10/2017 | Shulga | G06F 11/14 |
| 2017/0371547 A1* | 12/2017 | Fruchtman | G06F 11/1448 |

* cited by examiner

DATE PROTECTION RESTORE CLIENT

| USER | ADMIN |

| USER | USER |
| PASSWORD | PASSWORD |
| LOGIN OPTION | ◉ LOGIN TO ORIGINAL VM<br>○ LOGIN TO ALTERNATE VM<br>VM FQDN HOSTNAME OR IP ADDRESS |

LOGIN

Fig.3

METHODS, DEVICES, AND A COMPUTER READABLE MEDIUM FOR RESTORING A FILE IN A VIRTUAL MACHINE DISK

RELATED APPLICATIONS

This application claim priority from Chinese Patent Application Number CN 201711090107.X, filed on Oct. 27, 2017 at the State Intellectual Property Office, China, titled "METHOD, APPARATUS, AND COMPUTER READABLE MEDIUM FOR RESTORING A FILE IN A VIRTUAL MACHINE DISK" the contents of which is herein incorporated by reference in its entirety.

FIELD

Embodiments of the present disclosure generally relate to a field of virtual machines, and more specifically, to methods, devices, and a computer readable medium for restoring a file in a virtual machine disk.

BACKGROUND

In a field of virtual machines, file level restore is a great feature in virtual machine backup/restore systems, such as Avamar, to help end users to perform granular file/folder level restore.

A Virtual Machine Disk (VMDK) is a corresponding disk in a virtual machine, and a virtual machine disk file is a file format that describes containers for virtual hard disk drivers to be used in virtual machines, such as VMware. The virtual machine backup/restore system backs up virtual machine disk files into a back end storage (namely, a backup virtual machine disk), and provides the file level restore function to enable the user to browse and back up contents, such as a file or a folder, in the virtual machine disk and store them to the virtual machine disk.

However, when users of the virtual machine want to perform file level restore due to file lost or file damage or a desire of restoring a file to a previously-stored version, they must contact a system administrator for help. This is because when the backup virtual machine disk is mounted to a virtual machine backup/restore operating system, such as Avamar Proxy, in the virtual machine backup/restore system for browsing and restoring a virtual machine disk file in the backup virtual machine disk, the virtual machine disk file is analyzed and opened by the virtual machine backup/restore operating system, and then mounted as a portion of a file system in the virtual machine backup/restore operating system.

Because an operating system of a virtual machine and a virtual machine backup/restore operating system are independent on each other, current virtual machine backup/restore systems do not have an access evaluation process to validate the access right of a user of the virtual machine backup/restore system to files/folders in the virtual machine. Therefore, no access right protection is performed for the virtual machine disk files in the backup virtual machine disk, and furthermore, at this time users of the virtual machine backup/restore system may view and restore all virtual machine disk files in the backup virtual machine disk, namely, may view and restore files/folders that may be accessible to all virtual machine users in the corresponding virtual machine disk. Therefore, in consideration of file safety, the current virtual machine backup/restore can only be performed by an administrator through an administrator console or a file level restore web service portal, wherein the web service portal was set in a way that only administrators or root users of the virtual machine can login. Therefore, the file/folder view and restore function of the virtual machine backup/restore system is only used or performed by the administrators or root users of the virtual machine.

Each time users of a virtual machine contact a system administrator to require to use a backup virtual machine disk to recover files in a virtual machine disk, the administrator uses an access control list (ACL) option of a virtual machine backup/restore system to find and restore virtual machine disk files accessible to the users of the virtual machine. This process is invisible for the users of the virtual machine, and the users of the virtual machine can only wait for the administrator to complete the operation when he is free. Hence, in the current virtual machine backup/restore systems, the users of the virtual machine cannot implement the browse/restore of the virtual machine disk files alone, even though these files exclusively belong to the user. Meanwhile, because restore of the virtual machine disk files must be performed by the administrators of the virtual machine through the virtual machine backup/restore system, and the virtual machine administrators may not perform the operation at any time, so timely restore of the virtual machine disk file cannot be achieved. Furthermore, because the virtual machine users cannot visually see all accessible files in the backup virtual machine disk, it is often necessary to perform file restore purposefully, namely, to definitely know attribute information, such as file name and creation time, of files to be restored. This not only limits the scope and success rate of the virtual machine users restoring the virtual machine disk file, but also reduces the efficiency of the virtual machine users restoring the virtual machine disk files.

SUMMARY

Embodiments of the present disclosure provide methods, devices, and a computer readable medium for restoring a file in a virtual machine disk.

In a first aspect of the present disclosure, provided is a method of restoring a file in a virtual machine disk. The method comprises: receiving, from a client, a user's request regarding restoring a file in a virtual machine disk; determining, based on the request and from a backup disk of the virtual machine disk, files accessible to the user; and providing the client with information related to the files accessible to the user.

In a second aspect of the present disclosure, provided is a method of restoring a file in a virtual machine disk. The method comprises: sending, to a server, a user's request regarding restoring a file in a virtual machine disk; and receiving, from a server, information related to files accessible to the user.

In a third aspect of the present disclosure, provided is a device for restoring a file in a virtual machine disk. The device comprises: at least one processing unit; and at least one memory coupled to the at least one processing unit and storing instructions to be executed by the at least one processing unit, the instructions, when being executed by the at least one processing unit, causing the device to perform acts comprising: receiving, from a client, a user's request regarding restoring a file in a virtual machine disk; determining, based on the request and from a backup disk of the virtual machine disk, files accessible to the user; and providing the client with information related to the files accessible to the user.

In a fourth aspect of the present disclosure, provided is a device for restoring a file in a virtual machine disk. The device comprises: at least one processing unit; and at least one memory coupled to the at least one processing unit and storing instructions to be executed by the at least one processing unit, the instructions, when being executed by the at least one processing unit, causing the device to perform acts comprising: sending, to a server, a user's request regarding restoring a file in a virtual machine disk; and receiving, from a server, information related to files accessible to the user.

In a fifth aspect of the present disclosure, provided is a computer readable storage medium. The computer readable storage medium has computer readable program instructions stored thereon, the computer readable program instructions, when being executed by a processing unit of a machine, causing the machine to implement any steps of the method described according to the first aspect and second aspect of the present disclosure.

This Summary is provided to introduce a selection of concepts in a simplified form that will be further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of exemplary embodiments of the present disclosure with reference to the accompanying drawings, the above and other objects, features, and advantages of the present disclosure will become more apparent, wherein the same reference numerals typically represent the same components in the exemplary embodiments of the present disclosure.

FIG. 3 shows a login interface 300 of a data protection restore client according to embodiments of the present disclosure;

Throughout the figures, the same or corresponding numerals denote the same or corresponding parts.

DETAILED DESCRIPTION OF EMBODIMENTS

Figure 1:
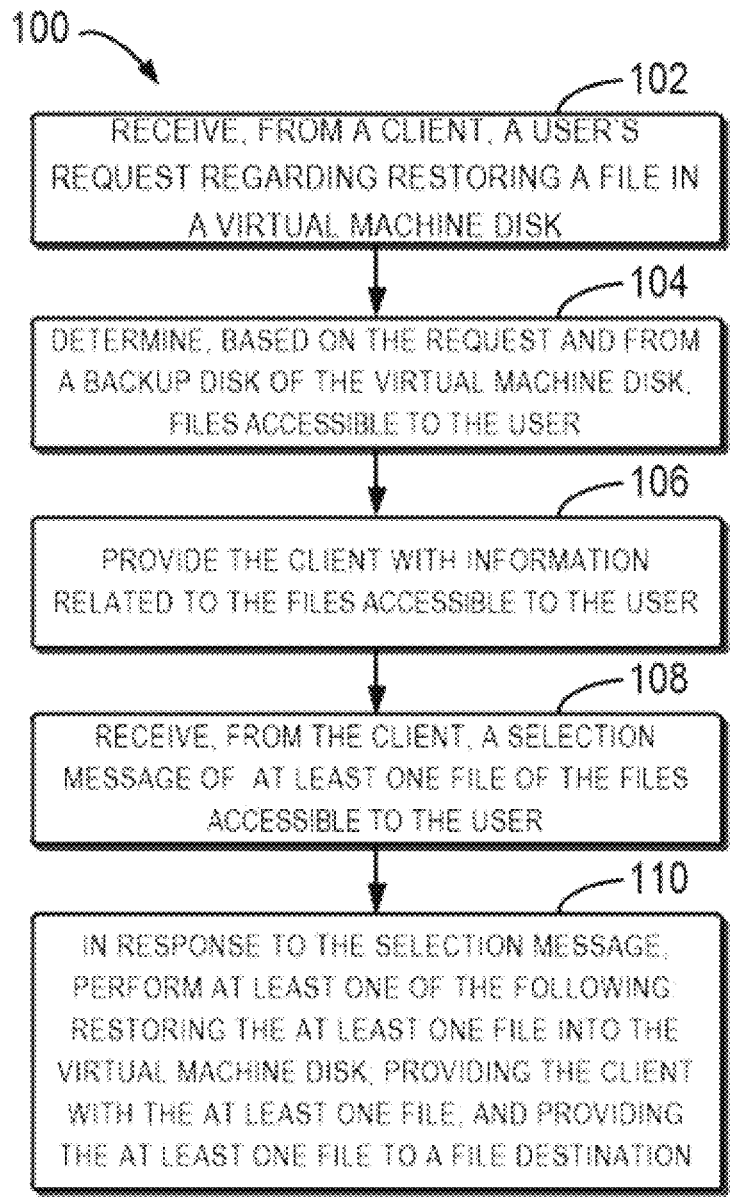
FIG. 1 shows a flowchart of a method 100 of restoring a file in a virtual machine disk according to embodiments of the present disclosure.

Some preferable embodiments will be described in more detail with reference to the accompanying drawings. Although the preferable embodiments of the present disclosure have been illustrated, however, it should be understood that the present disclosure can be implemented in various manners, and thus should not be construed to be limited to embodiments disclosed herein. On the contrary, those embodiments are provided for the thorough and complete understanding of the present disclosure, and completely conveying the scope of the present disclosure to those skilled in the art.

The terms "comprise" and its variants used herein are to be read as open terms that mean "include, but is not limited to." Unless otherwise specified, the term "or" is to be read as "and/or." The term "based on" is to be read as "based at least in part on". The terms "one example embodiment" and "one embodiment" are to be read as "at least one embodiment." The term "another embodiment" is to be read as "at least one other embodiment." The terms "first," "second" and the like may refer to different or the same objects. Other definitions, explicit and implicit, might be included below.

As described in the Background above, in the prior art, virtual machine users cannot implement the browse/restore of virtual machine disk files alone, and must depend on help from virtual machine backup/restore system administrators. Therefore, virtual machine users cannot restore files/folders to be restored in time, and they may also get confronted with a series of problems, such as a small restore scope, a low restore success rate, and a low restore efficiency. To at least partially solve the above problems and one or more of other potential problems, example embodiments of the present disclosure provide methods, devices, and a computer readable medium for restoring a file in a virtual machine disk. According to the present disclosure, the virtual machine users are provided with a smart self-service access right evaluation function and a virtual machine disk file restore function. By using these functions, the virtual machine users can, without the help from the virtual machine administrators, browse, in a self-service manner, virtual machine disk files/folders accessible to the users on the backup virtual machine disk, and restore virtual machine disk files/folders therein that the users want to restore. In the methods, devices, computer readable medium, and the functions, because operations required to browse/restore the folders are substantively the same as operations required to browse/restore the files, the methods, devices, and computer readable medium for restoring a file in a virtual machine disk in the present disclosure are described below mainly by describing the restore of files. However, it should be appreciated that the methods, devices, and computer readable medium for restoring a file in a virtual machine disk in the present disclosure also apply to the restore of folders. Hence, in the present disclosure, the term "file" may also include the concept of "folder."

FIG. 1 shows a flowchart of a method 100 of restoring a file in a virtual machine disk according to embodiments of the present disclosure. Specifically, according to the method 100, a process of restoring the file in the virtual machine disk is described from the perspective of a server 20, wherein the server 20 corresponds to the server of a virtual machine backup/restore system. It should be appreciated that the method 100 may further comprise additional steps that are not shown and/or may omit steps that are shown, and the scope of the present disclosure is not limited in this regard.

At block 102, the server 20 receives, from a client 10, a user's request regarding restoring a file in a virtual machine disk. According to embodiments of the present disclosure, a user of a virtual machine might need to restore files in the virtual machine disk in various cases, and these cases include but not limited to: virtual machine disk files get lost (e.g., deleted), the virtual machine disk files cannot be used normally (e.g., damaged, encrypted but the password is forgotten, renamed so that the files cannot be found), and the virtual machine disk files were amended wrongly (e.g., delete some contents from the virtual machine disk files and then save them). When the user of the virtual machine needs to restore the virtual machine disk files, he first needs to send a request to the server 20 via the client 10. Because the virtual machine might have a plurality of users, the user of the virtual machine is only permitted to browse/restore files accessible to them for the sake of safety. Therefore, the request sent by the user needs to include identity information of the user who wants to restore the file accessible to him.

At block 104, the server 20 determines, based on the request and from a backup disk of the virtual machine disk, files accessible to the user. According to some embodiments of the present disclosure, before determining, from the backup disk of the virtual machine disk, the files accessible to the user, it is first necessary to determine whether the virtual machine disk is accessible to the user by confirming the user's identity. Hence, in some embodiments of the present disclosure, the user may include his own identity information in the request, e.g., a user name and a password with respect to the virtual machine disk, and the user name and password with respect to the virtual machine corresponding to the virtual machine disk. Then, the server 20 extracts the user name and password with respect to the virtual machine from the request, and uses the user name and password to verify whether the virtual machine disk is accessible to the user.

It should be appreciated that the server 20 may verify the user's identity in other manners, without requiring the user to include his identity information in the request. For example, in the case that the user's identity is already previously verified, the server 20, within a predetermined time period after completion of such verification, may directly confirm the user's identity, needless to perform repeated verification. According to some embodiments of the present disclosure, in the above case, the server 20 may pre-store the user's identity information for subsequent verification.

Thereafter, in response to the virtual machine disk being accessible to the user, the server 20 determines, from the backup disk of the virtual machine disk, the files accessible to the user.

At block 106, the server 20 provides the client 10 with information related to the files accessible to the user. According to embodiments of the present disclosure, because the user might have a lot of files accessible to him in the virtual machine disk, it is impossible and uneconomic to directly send the client 10 all files accessible to the user. Hence, according to some embodiments of the present disclosure, providing the client 10 with information related to the files accessible to the user includes two cases. Firstly, the server 20 may provide, at the server 20, the files accessible to the user such that the user of the client 10 performs online browsing of these files. To protect files on the backup virtual machine disk, such online browsing may be limited as read only. In this form, if the user only needs a little information in the files (e.g., website address, telephone number, and the like recorded in the files), the user can achieve the purpose of obtaining relevant information by only browsing these files, without restoring the file into the virtual machine disk, thereby reducing the workload of the system and saving network traffic. Secondly, the server 20 may provide the client 10 with attribute of files accessible to the user. According to some embodiments of the present disclosure, attributes of files accessible to the user include but not limited to at least one of the following: a file name, a creation date, a modification date, a file type, a file size, a file author, and a file class. According to embodiments of the present disclosure, providing these attributes to the client 10 may include providing these attributes at the server 20 such that the user of the client 10 browses them online and directly sending the client 10 attributes of all files accessible to the user.

In whatever case, the user may determine whether the backup virtual machine disk include files that the user wants to restore by directly browsing files or browsing attributes of files. If the backup virtual machine disk does not include files that the user wants to restore or if the user does not want to continue to restore after browsing, the process may end up. As compared with the prior art, embodiments of the present disclosure enable the user to have a right to select files or their attributes to be browsed on his own, thereby substantially improving user experience.

When the backup virtual machine disk include files that the user wants to restore and the user wants to perform the restore operation, the user may select the files he wants to restore at the client 10, and the client 10 may notify the server 20 of such selection operation. At block 108, the server 20 receives, from the client 10, a selection message of at least one file of the files accessible to the user. According to embodiments of the present disclosure, after browsing the files or browsing the attributes of the files, the user may determine files that he wants to restore from the files accessible to him, and the number of these files is not limited. Meanwhile, the user may also select a folder he wants to restore, even if the folder does not include any file.

At block 110, in response to the selection message, the server 20 may perform the restore of the files. In some embodiments, the server 20 may restore the at least one file selected by the user to the virtual machine disk. Because the backup virtual machine disk is direct backup of the virtual machine disk, the server 20 may directly restore the selected files to a corresponding location in the virtual machine disk upon performing the restore operation of the files. Usually, restoring the selected files to the virtual machine disk may be considered as a default option in the restore operation.

Alternatively or additionally, in some embodiments, it is possible to provide the client 10 with at least one file selected by the user through the selection message. According to embodiments of the present disclosure, because the user sends a request to restore a file in the virtual machine disk to the server 20 via the client 10, the server 20 may directly provide the selected file to the client 10 such that the user can performs further operations on the selected file when the restore operation of the file is performed.

In some alternative or additional embodiments, it is possible to provide, to a file destination designated by the user, at least one file selected by the user through the selection message. According to embodiments of the present disclosure, the user sometimes does not need to restore the file to be restored into the virtual machine disk or send it to the client 10. Alternatively, the user may choose to let the server 20 provide the file to be restored to another location, e.g., a network disk, another virtual machine, another virtual machine disk of the same virtual machine, or publish the file to a social network in other manners. In this case, the server 20 may provide the selected file to the file destination designated by the user, thereby satisfying the user's different demands.

According to some embodiments of the present disclosure, the user may include the file destination in the request regarding restoring the file in the virtual machine disk sent to the server 20 via the client 10, the file destination indicating a destination to which the file is provided. At this time, the server 20 determines the file destination from the request. According to some other embodiments of the present disclosure, the user may include the file destination in the selection message. At this time, the server 20 determines the file destination from the selection message. According to some further embodiments of the present disclosure, the file destination may be pre-associated with the user or individually designated by the user at any time, such that the server may know the file destination in advance or obtain the file designation when the user designates it.

The process of restoring the file in the virtual machine disk is described from perspective of the server 20 with reference to FIG. 1. It should be appreciated that describing from perspective of the server 20 aims to better show the contents disclosed in the present disclosure, not to impose limitations in any manner.

Figure 2:
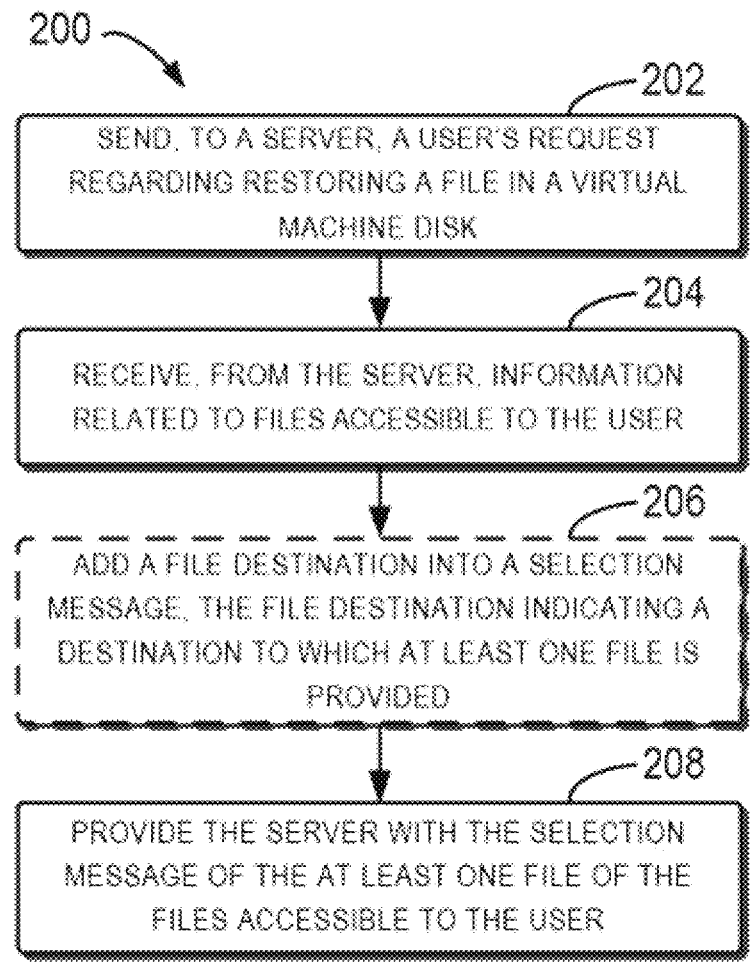
FIG. 2 shows a flowchart of a method 200 of restoring a file in a virtual machine disk according to embodiments of the present disclosure.

FIG. 2 shows a flowchart of a method 200 of restoring a file in a virtual machine disk according to embodiments of the present disclosure. Specifically, according to method 200, a flow of restoring a file in a virtual machine disk is described from perspective of the client 10, wherein the client 10 corresponds to a virtual machine client used by the user and corresponding to the virtual machine. It should be appreciated that the method 200 may further comprise additional steps that are not shown and/or may omit steps that are shown, and the scope of the present disclosure is not limited in this regard.

At block 202, the client 10 sends, to the server 20, a user's request to restoring a file in a virtual machine disk. The specific operation in block 202 corresponds to the specific operation described with reference to block 102 of FIG. 1, and will not be detailed any more here. Meanwhile, in conjunction with the above depictions about block 104 and block 108 of FIG. 1, the request may include a user name and password of the virtual machine to which the virtual machine disk belongs to, such that the server 20 may use the user name and password to verify whether the virtual machine disk is accessible to the user, and the request may further include the file destination to indicate a destination to which the server 20 provides the at least one file.

At block 204, the client 10 receives, from the server 20, information related to the files accessible to the user. The specific operation in block 204 corresponds to the specific operation described with reference to block 106 of FIG. 1, and will not be detailed any more here. Meanwhile, corresponding to the depictions about the block 106, the information received by the client 10 from the server 20 and related to the files accessible to the user may include performing online browsing of these files at the server 20 via network, performing online browsing of attributes of these files at the server 20 via network, and receiving attributes of these files directly from the server 20. The attributes of these files include but not limited to at least one of the following: a file name, a creation date, a modification date, a file type, a file size, a file author, and a file class.

At block 206, the client 10 adds the file destination to the selection message, and the file destination indicates a destination to which the server 20 provides the at least one file. As in the above depictions about block 110 of FIG. 1, it may be understood that this step is an optional step, so block 206 in the flowchart of the method 200 is shown by a dotted line.

At block 208, the client 10 provides the server 20 with a selection message of the at least one file of the files accessible to the user. The specific operation in block 208 corresponds to the specific operation described with reference to block 108 of FIG. 1, and will not be detailed any more here.

The process of restoring the file in the virtual machine disk is described from perspective of the client 10 with reference to FIG. 2. It should be appreciated that describing from perspective of the client 10 aims to better show the contents disclosed in the present disclosure, not to impose limitations in any manner.

FIG. 3 shows a login interface 300 of a data protection restore client (corresponding to file level restore self-service) according to embodiments of the present disclosure. According to some embodiments of the present disclosure, it is possible to provide a dedicated data protection restore client in a form of a plug-in or application in the client 10 and the server 20 to assist in performing the restore of the virtual machine disk file. In addition, the user may access the login interface 300 by accessing a self-service portal. In the login interface 300 of the data protection restore client, the user may choose to login in the identity of the user or administrator, and input the user name and password in corresponding fields and select the virtual machine to be logged in. After login in the identity of the administrator, it is possible to browse all files in the virtual machine disk and backup virtual machine disk and perform restore of files. Upon login in the identity of the user, it is only possible to browse files accessible to the user and perform restore. Regarding a Windows operating system user, if the Windows operating system is added an Active Directory, the user may use user name+"@"+domain DNS name, e.g., bily@company.com, and the user may choose a local operating system account if he has one. As for Linux user, the login operation performed are similar to the Windows operating system.

Figure 4:
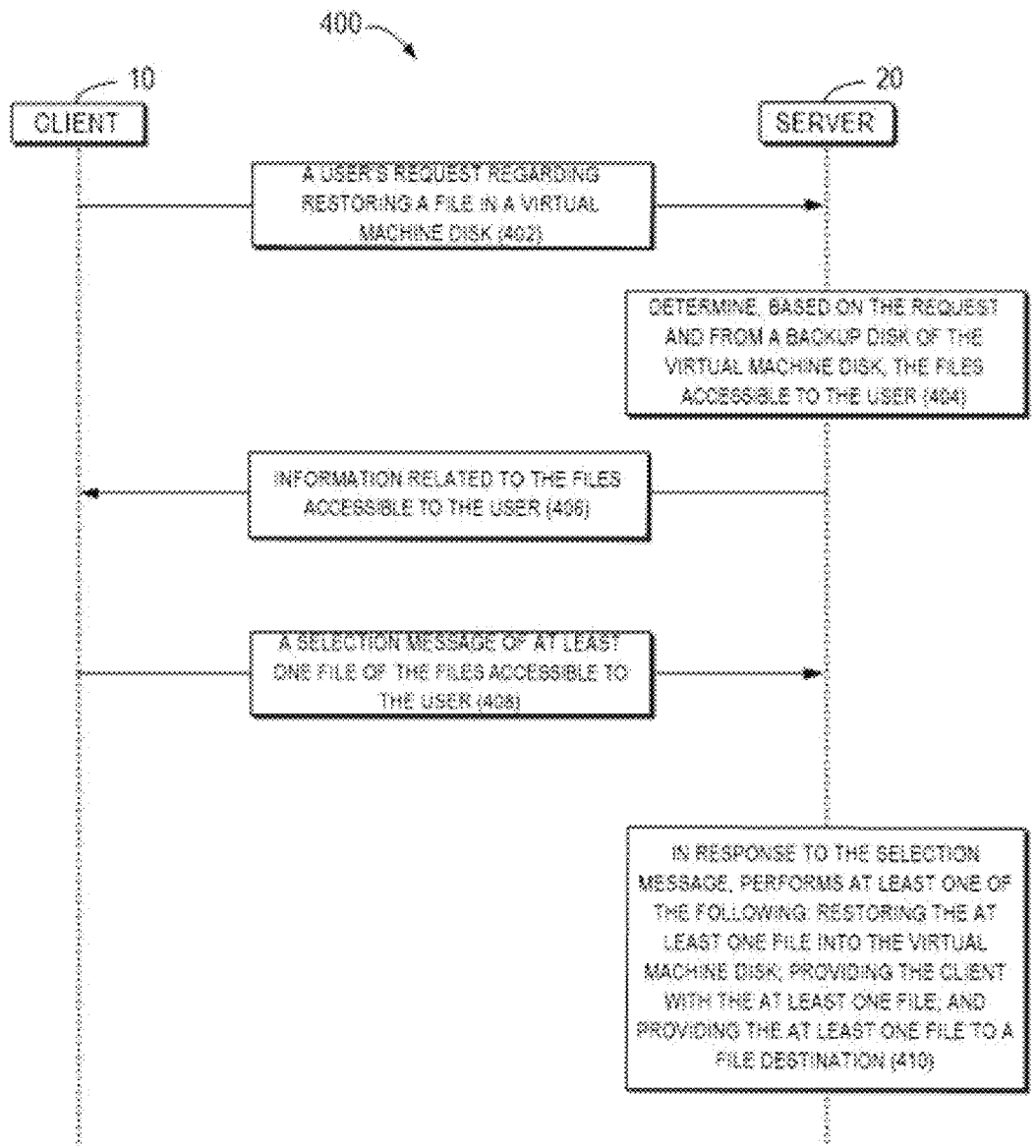
FIG. 4 shows a schematic diagram of an interaction operation process 400 of a client and a server according to embodiments of the present disclosure.

FIG. 4 shows a schematic diagram of an interaction operation process 400 of a client and a server according to embodiments of the present disclosure. The method of restoring the file in the virtual machine disk in the present disclosure will be described in more detail with reference to FIG. 4.

In Block 402 is shown a user's request regarding restoring the file in the virtual machine disk sent from the client 10 to the server 20. The specific operation involved by block 402 corresponds to the specific operation described with reference to block 102 of FIG. 1 and block 202 of FIG. 2, and will not be detailed any more here.

Further referring to FIG. 4, block 404 shows that the server 20 determines, based on the request and from the backup disk of the virtual machine disk, the files accessible to the user.

In the Windows system, regarding a virtual machine disk in NTFS format, a file/folder is protected by an access control list which includes a plurality of access control entries (ACE). A layout list of the access control entries is as shown in the following table 1, and it contains a security identifier (SID) field which identifies a user or group whose access is controlled or monitored by this ACE. If it is necessary to evaluate if the user can read the file/folder for backup or restore, it is necessary to get the user's SID including the security group's SID he belongs to.

TABLE 1

| ACE Field | Description |
|---|---|
| Type | Flag that indicates the type of ACE. Windows 2000 and Windows Server 2003 support six types of ACE: Three generic ACE types that are attached to all securable objects. Three object-specific ACE types that can occur for Active Directory objects. |

TABLE 1-continued

| ACE Field | Description |
| --- | --- |
| Flags | Set of bit flags that control inheritance and auditing. |
| Size | Number of bytes of memory that are allocated for the ACE. |
| Access mask | 32-bit value whose bits correspond to access rights for the object. Bits can be set either on or off, but the setting's meaning depends on the ACE type. For example, if the bit that correspond to the right to read permissions is turned on, and the ACE type is Deny, the ACE denies the right to read the object's permissions. If the same bit is set on but the ACE type is Allow, the ACE grants the right to read the object's permissions. More details of the Access mask appear in the next table. |
| SID | Identifies a user or group whose access is controlled or monitored by this ACE. |

The files accessible to the user may be determined in may manners. The determination process will be described by taking the Windows system and virtual machine disk in the NTFS format as examples.

In some embodiments, it is possible to determine the files accessible to the user via an active directory. First, the user provides a user name and password with respect to an operating system of the virtual machine where the file to be restored lies. As stated above, the user may send the user name or password from the client 10 to the server 20 in a request regarding restoring the file in the virtual machine disk.

The server 20 uses the received user name or password, and queries for the active directory by using a "token-groups" attribute. The "token-groups" attribute includes a security group where a given user or computer lies and includes a list of security identifiers of nested security groups. For example, a user belongs to a security group named "inner group" and the SID of the "inner group" is "s1", meanwhile this "inner group" is a member of "outside group" with SID "s2", the "token-groups" attribute will return both "s1", "s2" as a query result. If the access control list a File System's file has an Access Entry described that "outside group": "s2" has read access, following the access right inherent principles, and the user belonging to "inner group" also have read access on the file.

The server 20 uses the received user name and password, it is possible to automatically push an agent to the VMDK's virtual machine via a web service management API such as VSphere Web Service Management API, then use the Management API to trigger the agent running under the evaluation user's credential, this agent invokes Windows API to get the SID of the executing user and all local security groups SID that the user belongs to, include the nested groups. It should be appreciated that this agent may be pre-stored in the virtual machine without the pushing of the server 20.

When user browses folder/files inside the VMDK, the server 20 will mount the VMDK as flat folder/flat structure inside the server's operating system; for a NTFS format VMDK, the server 20 uses ntfs3g component to achieve that; ntfs3g will map the NTFS folder/file's ACL information into a Linux file extended attribute named "system-.ntfs_acl". At this stage, the server 20 will go through all NTFS Access Entries inside the "system.ntfs_acl", compare the Access Entry's SIDs to the SIDs string collected from the above determination process, find an entry can indicate the current evaluation user has an access right to the folder file, then mark this file entry as browse-able by the evaluation user.

If file/folder sets predefined security identifiers ("Everyone" and "INTERACTIVE)") to grant access, the user is treated as being capable of reading the file/folder. "Everyone" means all users in the Windows operating system. "INTERACTIVE" means the user that is currently logged on the Windows operating system. Some system folders, e.g., the c:\users\public folder has grant "INTERACTIVE" user read/write access by default, which indicate that all users whom logon to the Windows system can view/modify the public folder. For file level recovery scenario, this rule also applies, and the current evaluation user should also can browse/restore the folder.

Alternatively or additionally, in some embodiments, regarding local users of Windows, because no domain is added, the SIDs may be stored at different locations. However, the process of determining the files accessible to the user is very similar to the above process of determining the files accessible to the user through the Active Directory, and their difference only lies in no need to perform Active Directory query.

In a Linux system, the files accessible to the user may be determined in the following manners with respect to the virtual machine disk.

First, in the Linux system, three Permission Groups are used for access evaluation: owner, group, and other users. Specifically, Linux file access rights principles are as follows:

-rw-rw-r-- 1 archie users 5120 Jun 27 08:28 customer-s.ods
-rw-r--r-- 1 archie users 3339 Jun 27 08:28 todo
-rwxr-xr-x 1 archie users 2048 Jul 6 12:56 myscript.sh The Permission Groups used are:
Owner
Group
o or a-All users The Potential Assignment Operators are +(plus) and − (minus); these are used to tell the system whether to add or remove the specific permissions.

The Permission Types that are used are:
r—Read
w—Write
x—Execute

In some embodiments, when the files accessible to the user is determined in the Linux system, first, the user provides the user name and password of the operating system of the virtual machine where the file to be restored lies. As stated above, the user may send the user name and password from the client 10 to the server 20 in the request regarding restoring the file in the virtual machine disk.

The server 20 uses the received user name and password, uses the Management API, such as Vmware management API, to trigger a shell script execute under the evaluation user's credential, and this script will collect the evaluation users UID and Group ID inside the Linux operating system.

When user browses file/folder inside the VMDK, the server 20 will mount the VMDK as a flat structure inside its own operating system, check the mounted file/folder' access permission information, if the UID is 0, which indicate the user is root user, then he can read all files in the VMDK.

If the UID is matching the file's owner ID, then mark the file as browse-able by the user.

If the Group ID is matching the files group ID, also mark the file as browse-able by the user.

If the file's other users read flag is set, mark the file as browse-able by the user.

Block 406 shows information sent from the server 20 to the client 10 and related to the files accessible to the user.

The specific operation involved by block 406 corresponds to the specific operation described with reference to block 106 of FIG. 1 and block 204 of FIG. 2, and will not be detailed any more here.

At block 408 shows a selection message of at least one file of the files accessible to the user, which is sent from the client 10 to the server 20. The specific operation involved by block 408 corresponds to the specific operation described with reference to block 108 of FIG. 1 and block 208 of FIG. 2, and will not be detailed any more here.

Block 410 shows that the server 20, in response to the selection message, performs at least one of the following: restoring at least one file into the virtual machine disk; providing the client with the at least one file; and providing the at least one file to a file destination. The specific operation involved by block 406 corresponds to the specific operation described with reference to block 110 of FIG. 1, and will not be detailed any more here.

Through the above depictions with reference to FIG. 1 to FIG. 4 and in comparison with the prior art described in the Background, use of the technical solutions of embodiments of the present disclosure has the following advantages:

1. By using the technical solutions of embodiments of the present disclosure, the virtual machine user can implement browsing backup files of the virtual machine disk files and restoring them alone without the administrator's help.

2. Because it is unnecessary to wait for the administrator's help, the virtual machine user can restore the virtual machine disk file in time.

3. Because it is possible to directly browse all files accessible to the user or their attributes, the scope of files that can be restored by the virtual machine user is larger.

4. Because it is possible to visually browse all files accessible to the user or their attributes, the virtual machine user, upon restoring the file, may have a higher restoration success rate or restoration efficiency.

5. Because the access control list is used, no matter whether the user is an Active Directory user or local user, he may visually determine the user's access right to the file.

6. It is also possible to determine the Linux user's access right to the file by checking the permission groups.

Figure 5:
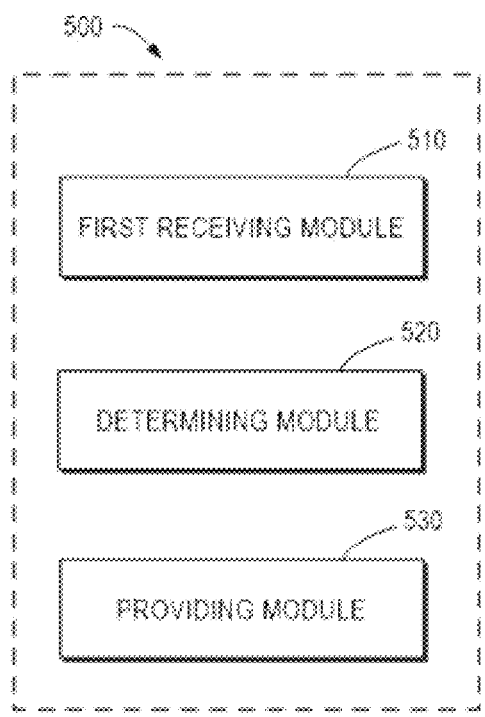
FIG. 5 shows a block diagram of a device 500 for restoring a file in a virtual machine disk according to embodiments of the present disclosure.

FIG. 5 shows a block diagram of a device 500 for restoring a file in a virtual machine disk according to embodiments of the present disclosure. For example, the 100 for restoring a file in a virtual machine disk as shown in FIG. 1 may be implemented by the device 500. As shown in FIG. 5, the device 500 may comprise a first receiving module 510 configured to receive, from a client, a user's request regarding restoring a file in a virtual machine disk. The device 500 may further comprise a determining module 520 configured to determine, based on the request and from a backup disk of the virtual machine disk, files accessible to the user. The device 500 may further comprise a providing module 530 configured to provide the client with information related to the files accessible to the user.

For the sake of clarity, FIG. 5 does not show some optional modules of the device 500. However, it should be appreciated that features described above with reference to FIG. 1 through FIG. 4 also apply to the device 500. Furthermore, modules of the device 500 may be hardware modules or software modules. For example, in some embodiments, the device 500 may be implemented partially or completely by software and/or firmware, e.g., implemented as a computer program product embodied on a computer readable medium. Alternatively or additionally, the device 500 may be implemented partially or completely based on hardware, e.g., implemented as an integrated circuit (IC), an application-specific integrated circuit (ASIC), a system on chip (SOC), a field programmable gate array (FPGA), and the like. The scope of the present invention is not limited in this aspect.

Figure 6:
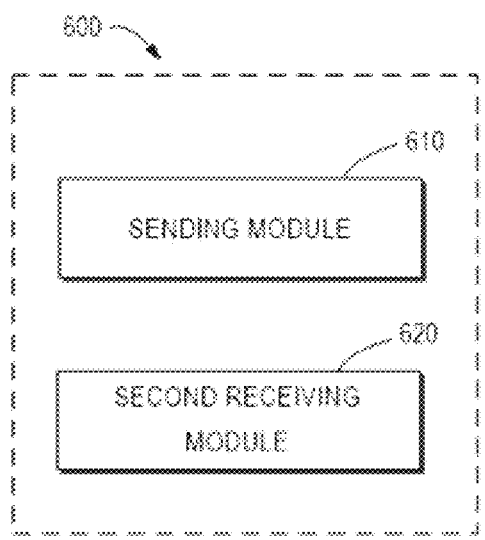
FIG. 6 shows a block diagram of a device 600 for restoring a file in a virtual machine disk according to embodiments of the present disclosure.

FIG. 6 shows a block diagram of a device 600 for restoring a file in a virtual machine disk according to embodiments of the present disclosure. For example, the 200 for restoring a file in a virtual machine disk as shown in FIG. 2 may be implemented by the device 600. As shown in FIG. 6, the device 600 may comprise a sending module 610 configured to send, to a server, a user's request regarding restoring a file in a virtual machine disk. The device 600 may further comprise a second receiving module 620 configured to receive, from the server, information related to files accessible to the user.

For the sake of clarity, FIG. 6 does not show some optional modules of the device 600. However, it should be appreciated that features described above with reference to FIG. 1 through FIG. 4 also apply to the device 600. Furthermore, modules of the device 600 may be hardware modules or software modules. For example, in some embodiments, the device 600 may be implemented partially or completely by software and/or firmware, e.g., implemented as a computer program product embodied on a computer readable medium. Alternatively or additionally, the device 600 may be implemented partially or completely based on hardware, e.g., implemented as an integrated circuit (IC), an application-specific integrated circuit (ASIC), a system on chip (SOC), a field programmable gate array (FPGA), and the like. The scope of the present invention is not limited in this aspect.

Figure 7:
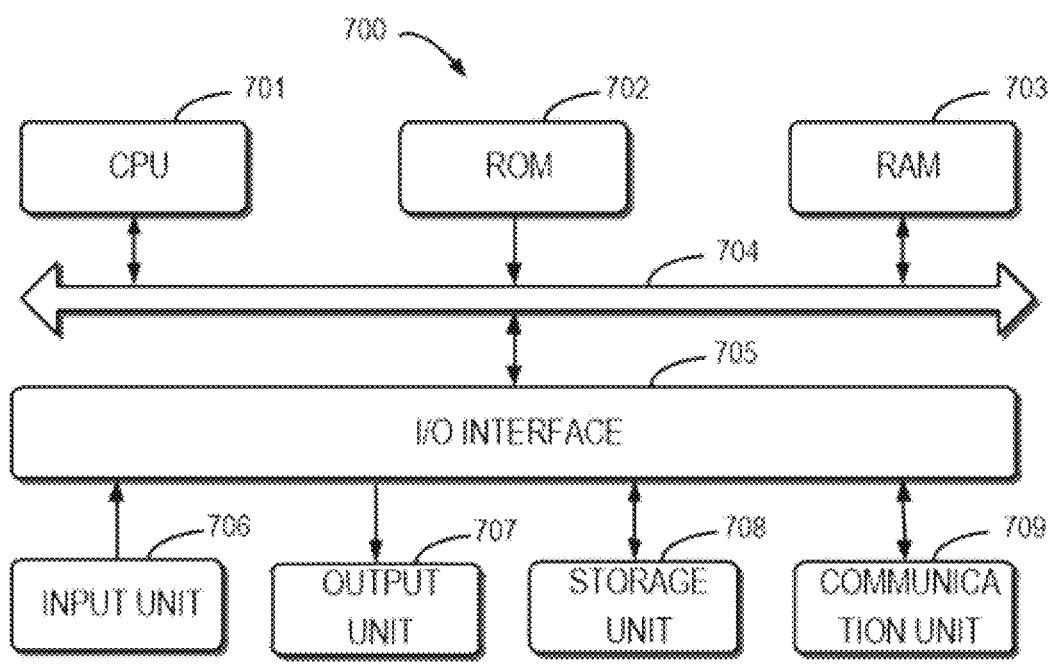
FIG. 7 shows a schematic block diagram of an example device 700 that is applicable to implement embodiments of the present disclosure.

FIG. 7 shows a schematic block diagram of an example device 700 that is applicable to implement embodiments of the present disclosure. As depicted, the device 700 comprises a central processing unit (CPU) 701 which is capable of performing various appropriate actions and processes in accordance with computer program instructions stored in a read only memory (ROM) 702 or computer program instructions loaded from a storage unit 708 to a random access memory (RAM) 703. In the RAM 703, there are also stored various programs and data required by the device 700 when operating. The CPU 701, the ROM 702, and the RAM 703 are connected to one another via a bus 704. An input/output (I/O) interface 705 is also connected to the bus 704.

Multiple components in the device 700 are connected to the I/O interface 705, these components includes: an input unit 706, e.g., a keyboard, a mouse, or the like; an output unit 707, e.g., various types of displays, loudspeakers, or the like; a storage unit 708, e.g., a disk, an optical disk, or the like; and a communication unit 709, e.g., a network card, a modem, a wireless communication transceiver, or the like. The communication unit 709 allows the device 700 to exchange information/data with other devices via a computer network, e.g., the Internet, and/or various telecommunication networks.

The above-described procedures and processes, e.g., the method 100 and method 200, may be executed by the processing unit 701. For example, in some embodiments, the method 100 and method 200 may be implemented as a computer software program, which is tangibly embodied on a machine readable medium, e.g., the storage unit 708. In some embodiments, part or the entirety of the computer program may be loaded to and/or installed on the device 700 via the ROM 702 and/or the communication unit 709. The computer program, when being loaded to the RAM 703 and executed by the CPU 701, may perform one or more actions of the method 100 and method 200 as described above.

The present disclosure may be a method, a device, a system, and/or a computer program product. The computer program product may include a computer readable storage medium (or media) having computer readable program instructions thereon for carrying out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combinations of the foregoing. More specific examples of the computer readable storage medium (a non-exhaustive list) includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device (e.g., punch-cards or raised structures in a groove having instructions recorded thereon), and any suitable combinations of the foregoing. A computer readable storage medium, as used herein, is not to be construed as being transitory signals per se, e.g., radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or an external storage device via a network, e.g., the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storing in computer readable storage media in the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source codes or object codes written in any combination of one or more programming languages, including an object oriented programming language such as Java, Smalltalk, C++, or the like, and conventional procedural programming languages such as the "C" language or similar programming languages. The computer readable program instructions may execute entirely on the user's computer, partly on the user's computer, as a stand-alone software package, partly on the user's computer and partly on a remote computer, or entirely on the remote computer or server. In the latter scenario related to the remote computer, the remote computer may be connected to the user's computer through any type of networks, including a local area network (LAN) or a wide area network (WAN), or the connection may be made to an external computer (for example, through the Internet using an Internet Service Provider). In some embodiments, electronic circuitry including, e.g., programmable logic circuitry, field-programmable gate arrays (FPGA), or programmable logic arrays (PLA) may execute the computer readable program instructions by utilizing state information of the computer readable program instructions to personalize the electronic circuitry, in order to carry out aspects of the present disclosure.

Aspects of the present disclosure are described herein with reference to flowcharts and/or block diagrams of methods, devices (systems), and computer program products according to embodiments of the invention. It should be understood that each block of the flowcharts and/or block diagrams, and combinations of blocks in the flowcharts and/or block diagrams, can be implemented by computer readable program instructions.

These computer readable program instructions may be provided to a processor of a general purpose computer, special purpose computer, or other programmable data processing apparatuses to produce a machine, such that the instructions, when executing via the processor of the computer or other programmable data processing apparatus, create means for implementing the functions/acts specified in the flowchart and/or block diagram block or blocks. These computer readable program instructions may also be stored in a computer readable storage medium, such these instructions can direct a computer, a programmable data processing apparatus, and/or other devices to function in a particular manner, such that the computer readable storage medium having instructions stored therein comprises an article of manufacture including instructions that carry out aspects of the function/act specified in the flowchart and/or block diagram block or blocks.

The computer readable program instructions may also be loaded onto a computer, other programmable data processing apparatuses, or other devices to cause a series of operational steps to be performed on the computer, other programmable data processing apparatuses, or other devices to produce a computer implemented process, such that the instructions which execute on the computer, other programmable data processing apparatuses, or other devices carry out the functions/acts specified in the flowchart and/or block diagram block or blocks.

The flowcharts and block diagrams in the figures illustrate the architectures, functionalities, and operations of possible implementations of systems, methods, and computer program products according to various embodiments of the present disclosure. In this regard, each block in the flowcharts or block diagrams may represent a module, a segment of program, or portion of codes, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform specified functions or acts, or can be implemented by combinations of special purpose hardwares and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

We claim:

1. A device for restoring a file in a virtual machine disk, comprising:
   at least one processing unit; and
   at least one memory coupled to the at least one processing unit and storing instructions to be executed by the at least one processing unit, the instructions, when being executed by the at least one processing unit, causing the device to perform acts comprising:
      receiving, from a client, a user's request regarding restoring a file in a virtual machine disk;
      determining, based on the request and from a backup disk of the virtual machine disk, files accessible to the user, the determination comprising:
         extracting, from the request, identity information of the user, the identity information of the user comprising a user name and a password with respect to the virtual machine disk;
         verifying, based on the identity information of the user, whether the virtual machine disk is accessible to the user; and
         in response to the virtual machine disk being accessible to the user, determining, from the backup disk of the virtual machine disk, the files accessible to the user, the determination comprising:
            mounting the virtual machine disk as a flat file structure in an operating system of the device, and
            evaluating access permissions of the user to the mounted files based on the identity information of the user; and
      providing the client with information related to the files accessible to the user.

2. The device according to claim 1, wherein providing the client with the information related to the files accessible to the user comprises:
   providing the client with at least one of the following:
      the files accessible to the user, and
      an attribute of the files accessible to the user.

3. The device according to claim 2, wherein the attribute of the files accessible to the user comprises at least one of the following: a file name, a creation date, a modification date, a file type, a file size, a file author, and a file class.

4. The device according to claim 1, wherein the acts further comprise:
   receiving, from the client, a selection message of at least one file of the files accessible to the user; and
   in response to the selection message, performing at least one of the following:
      restoring the at least one file into the virtual machine disk;
      providing the client with the at least one file; and
      providing the at least one file to a file destination.

5. The device according to claim 4, wherein providing the at least one file to the file destination comprises at least one of the following:
   determining, from the request, the file destination;
   determining, based on the selection message, the file destination; and
   determining a file destination associated with the user.

6. The device according to claim 1, wherein the operating system comprises at least one of the following: Windows and Linux.

7. The device according to claim 1, wherein the acts further comprise:
   receiving, from the client, a selection message of at least one file of the files accessible to the user; and
   in response to the selection message, publishing the at least one file to a social network.

8. A method of restoring a file in a virtual machine disk, comprising:
   receiving, from a client, a user's request regarding restoring a file in a virtual machine disk;
   determining, based on the request and from a backup disk of the virtual machine disk, files accessible to the user, the determination comprising:
      extracting, from the request, identity information of the user, the identity information of the user comprising a user name and a password with respect to the virtual machine disk;
      verifying, based on the identity information of the user, whether the virtual machine disk is accessible to the user; and
      in response to the virtual machine disk being accessible to the user, determining, from the backup disk of the virtual machine disk, the files accessible to the user, the determination comprising:
         mounting the virtual machine disk as a flat file structure in an operating system of the device, and
         evaluating access permissions of the user to the mounted files based on the identity information of the user; and
      providing the client with information related to the files accessible to the user.

9. The method according to claim 8, wherein providing the client with the information related to the files accessible to the user comprises:
   providing the client with at least one of the following:
      the files accessible to the user, and
      an attribute of the files accessible to the user.

10. The method according to claim 9, wherein the attribute of the files accessible to the user comprises at least one of the following: a file name, a creation date, a modification date, a file type, a file size, a file author, and a file class.

11. The method according to claim 8, further comprising:
    receiving, from the client, a selection message of at least one file of the files accessible to the user; and
    in response to the selection message, performing at least one of the following:
       restoring the at least one file into the virtual machine disk;
       providing the client with the at least one file; and
       providing the at least one file to a file destination.

12. The method according to claim 11, wherein providing the at least one file to the file destination comprises at least one of the following:
    determining, from the request, the file destination;
    determining, based on the selection message, the file destination; and
    determining a file destination associated with the user.

13. The method according to claim 8, wherein the security identifier of the user is associated with a nested security group of the user.

14. The method according to claim 8, wherein the security identifier of the user is controlled by one or more access control entries of an access control list.

15. The method according to claim 8, wherein the querying the operating system configured on the virtual machine disk comprises querying a token-groups attribute of the user based on the identity information of the user.

16. The method according to claim 8, wherein providing the client with the information related to the files accessible to the user comprises providing the client with a file class attribute of the files accessible to the user.

17. A method of restoring a file in a virtual machine disk, comprising:
- sending, to a server, a user's request regarding restoring a file in a virtual machine disk; and
- receiving, from the server, information related to files accessible to the user, wherein the information is determined based on the request and from a backup disk of the virtual machine disk, the determination comprising:
  - identity information of the user extracted from the request, the identity information of the user comprising a user name and a password with respect to the virtual machine disk;
  - verification, based on the identity information of the user, of whether the virtual machine disk is accessible to the user; and
  - in response to the virtual machine disk being accessible to the user, a determination, from the backup disk of the virtual machine disk, of the files accessible to the user, the determination comprising:
    - an evaluation of access permissions of the user to mounted files of the virtual machine disk,
    - wherein the virtual machine disk is mounted as a flat file structure in an operating system of the server and the access permissions are evaluated based on the identity information of the user.

18. The method according to claim 17, wherein receiving the information related to the files accessible to the user comprises receiving at least one of the following:
- the files accessible to the user, and
- an attribute of the files accessible to the user.

19. The method according to claim 18, wherein the attribute of the files accessible to the user comprises at least one of the following: a file name, a creation date, a modification date, a file type, a file size, a file author, and a file class.

20. The method according to claim 17, wherein receiving the information related to the files accessible to the user comprises receiving a file class attribute of the files accessible to the user.

* * * * *